(12) United States Patent
Lou et al.

(10) Patent No.: US 7,688,902 B1
(45) Date of Patent: *Mar. 30, 2010

(54) JOINT SPACE-TIME BLOCK DECODING AND VITERBI DECODING

(75) Inventors: Hui-Ling Lou, Palo Alto, CA (US); Kok-Wui Cheong, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 1872 days.

This patent is subject to a terminal disclaimer.

(21) Appl. No.: 10/675,693

(22) Filed: Sep. 30, 2003

Related U.S. Application Data (60) Provisional application No. 60/463,230, filed on Apr. 16, 2003.

(51) Int. Cl.
*H04L 27/28* (2006.01)
(52) U.S. Cl. .................. 375/260; 375/340; 375/341; 714/796
(58) Field of Classification Search ................. 375/260, 375/261, 268, 269, 271–273, 279, 316, 320, 375/322, 323–325, 329, 331, 340, 341, 265; 714/786, 792, 794, 795, 796; 455/205, 208, 455/214; 329/300, 302, 304, 306, 323, 345, 329/346, 358
See application file for complete search history.

(56) References Cited

U.S. PATENT DOCUMENTS

| | | | | |
|---|---|---|---|---|
| 5,757,834 A | * | 5/1998 | Fang et al. | ................... 714/789 |
| 5,790,606 A | | 8/1998 | Dent | |
| 6,154,871 A | * | 11/2000 | Claydon et al. | ............. 714/795 |
| 6,157,683 A | * | 12/2000 | Daribi et al. | ................. 375/341 |
| 6,178,196 B1 | | 1/2001 | Naguib et al. | |
| 6,188,736 B1 | | 2/2001 | Lo et al. | |
| 6,317,466 B1 | | 11/2001 | Foschini et al. | |

(Continued)

FOREIGN PATENT DOCUMENTS

EP 1271835 A2 1/2003

(Continued)

OTHER PUBLICATIONS

"802.16 IEEE Standard for Local and Metropolitan Area Networks; Part 16: Air Interface for Fixed Broadband Wireless Access Systems," 802.16 IEEE Standard for Local and Metropolitan Area Networks, Oct. 1, 2004, pp. i-xxxiv and pp. 1-857, IEEE Std 802.16-2004, IEEE, United States.

(Continued)

*Primary Examiner*—Dac V Ha (57) ABSTRACT

A space-time block decoder for a wireless communications system includes a demodulator that generates a demodulated symbol sequence by derotating a signal constellation of a received symbol sequence. A dimension demultiplexer communicates with the demodulator and generates in-phase and quadrature components of the demodulated symbol sequence. A branch metric computation module communicates with the dimension demultiplexer and generates branch metrics based on the in-phase and quadrature components. A Viterbi decoder communicates with the branch metric computation module and generates a user data sequence based on the branch metrics. The in-phase and quadrature components comprise Gray coded data that is bit-interleaved. The branch metric computation module implements bit-by-bit piecewise linear approximation to generate the branch metrics. A deinterleaver that communicates with the branch metric computation module generates deinterleaved metrics based on the branch metrics.

95 Claims, 7 Drawing Sheets

U.S. PATENT DOCUMENTS

| | | | |
|---|---|---|---|
| 6,542,556 | B1 | 4/2003 | Kuchi et al. |
| 6,549,585 | B2 | 4/2003 | Naguib et al. |
| 6,680,986 | B1 * | 1/2004 | Hemmati ............... 375/341 |
| 6,690,751 | B1 * | 2/2004 | Nikula et al. ............ 375/341 |
| 6,891,897 | B1 * | 5/2005 | Bevan et al. ............. 375/265 |
| 6,922,438 | B1 * | 7/2005 | Eidson .................. 375/224 |
| 6,959,047 | B1 * | 10/2005 | Al-Dhahir et al. ......... 375/267 |
| 6,977,972 | B1 * | 12/2005 | Kandala et al. ........... 375/332 |
| 7,010,054 | B2 * | 3/2006 | El-Gamal et al. .......... 375/267 |
| 7,046,747 | B2 * | 5/2006 | Vasquez ................. 375/341 |
| 7,109,787 | B2 * | 9/2006 | Meyer ................... 329/304 |
| 2002/0196842 | A1 * | 12/2002 | Onggosanusi et al. |
| 2003/0016640 | A1 | 1/2003 | Onggosanusi et al. |

FOREIGN PATENT DOCUMENTS

WO      WO 02/098051 A1      12/2002

OTHER PUBLICATIONS

IEEE Standard 802.11a (1999; 91 pages); Supplement to IEEE Standard for Information Technology; Telecommunications and Information Exchange Between Systems; Local and Metropolitan Area Networks; Specific Requirements; Part 11: Wireless LAN Medium Access Control (MAC) and Physical Layer (PHY) Specifications; High-Speed Physical Layer in the 5 GHz Band; Adopted by the ISO/IEC and redesignated as ISO/IEC 8802-11:1999/Amd 1:2000(E).

IEEE Standard P802.11g, Draft Supplement to Standard for Information technology—Telecommuncations and information exchange beween systems—Local and metropolitan area networks—Specific requirements, Part 11: Wireless LAN Medium Access Control (MAC) and Physical Layer (PHY) specifications: Further Higher Data Rate Extension in the 2.4 GHz Band, Apr. 2003, pp. 1-69.

IEEE Std. 802.16a; IEEE Standard for Local and metropolitan area networks; Part 16: Air Interface for Fixed Broadband Wireless Access Systems—Amendment 2: Medium Access Control Modifications and Additional Physical Layer Specifications for 2-11 GHz; Apr. 1, 2003; pp. 1-292.

Lou/Cheong/Shirali/Narasimhan, "On division-free frequency domain equalization and Viterbi decoding using channel state information" Mar. 8, 2002, pp. 1-18.

Siavash M. Alamouti, "A Simple Transmit Diversity Technique for Wireless Communications", IEEE Journal on Select Areas in Communications, vol. 16, No. 8, Oct. 1998, pp. 1451-1458.

Alamouti/Tarokh/Poon, "Trellis coded modulation and transmit diversity: Design criteria and performance evaluation," Proceedings of IEEE ICUPC, pp. 703-707, Oct. 1998.

Tarokh/Jafarkhani/Calderbank, "Space-Time Block Codes from Orthogonal Designs", IEEE Transactions on Information Theory, vol. 45, No. 5, Jul. 1999, pp. 1456-1467.

Tarokh/Jafarkhani/Calderbank, "Space-Time Block Coding for Wireless Communications: Performance Results", IEEE Journal on Selected Areas in Communications, vol. 17, No. 3, Mar. 1999, pp. 451-460.

* cited by examiner

JOINT SPACE-TIME BLOCK DECODING AND VITERBI DECODING

CROSS-REFERENCE TO RELATED APPLICATIONS

This application claims the benefit of U.S. Provisional Application No. 60/463,230, filed on Apr. 16, 2003, which is hereby incorporated by reference in its entirety.

FIELD OF THE INVENTION

The present invention relates to wireless communications systems, and more particularly to wireless communications systems that implement space-time block encoding.

BACKGROUND OF THE INVENTION

Space-time coding is used in wireless communications systems that include multiple receive and/or transmit antennae. Space-time codes exploit the spatial diversity of wireless systems by taking advantage of multiple transmission paths between transmitters and receivers. Systems that implement space-time block coding transmit blocks that include a predetermined number of symbols. While space-time block coding may be used to increase a data rate of a system, space-time block codes are commonly used to add redundancy to wireless data transmissions and to increase the power of transmissions. This increases the reliability of wirelessly transmitted data and increases the range of the system.

For example, wireless access systems according to the IEEE 802.16a standard, which is hereby incorporated by reference in its entirety, enable the use of space-time block codes that utilize two transmit antennae. Additionally, there is interest in applying space-time block coding to next-generation wireless local area networks (WLANs).

Figure 1:
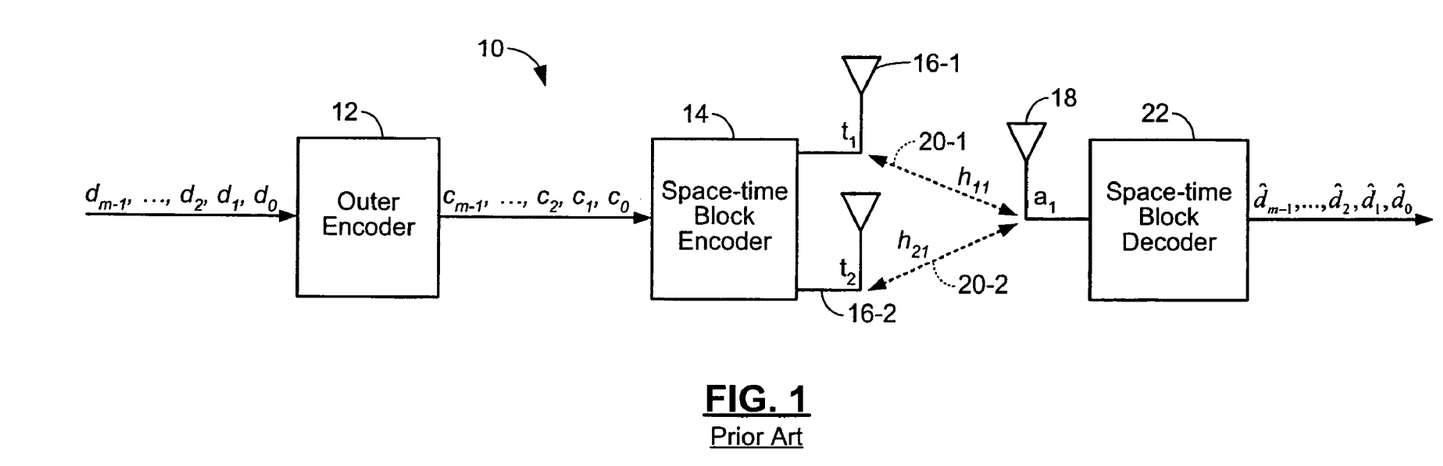
FIG. 1 is a functional block diagram of a wireless communications system that implements space-time block coding with two transmit antennae and one receive antenna according to the prior art.

Referring to FIG. 1, a first wireless communications system 10 includes an outer encoder 12 that is in concatenation with a space-time block encoder 14. For example, the outer encoder 12 may be a trellis coded modulation (TCM) encoder, a bit-interleaved coded modulation (BICM) encoder, or other suitable encoder. An input of the outer encoder 12 receives a user data sequence $d=\{d_0, d_1, d_2, \ldots, d_{k-1}\}$ comprising k bits of user data. Some space-time block codes provide diversity gain at the expense of coding gain. Therefore, the outer encoder 12 provides coding gain to further improve system performance. The outer encoder 12 maps the user data sequence d to constellation points of a signal constellation and generates a symbol sequence $c=\{c_0, c_1, c_2, \ldots, c_{m-1}\}$. The outer encoder 12 outputs the symbol sequence c to an input of the space-time block encoder 14. The space-time block encoder 14 generates blocks that include one or more symbols. The blocks are transmitted by first and second transmit antennae 16-1 and 16-2, respectively, during one or more symbol periods.

In one configuration, the space-time block encoder 14 implements a rate-1 orthogonal space-time block code. The rate R=k/p is the ratio of the number of symbols k in a block to the number of symbol periods p that are required to transmit the k symbols. For example, one space-time block encoder encodes two symbols per block according to $$G_2 = \begin{bmatrix} x_1 & x_2 \\ -x_2^* & x_1^* \end{bmatrix},$$

where $x_1$ and $x_2$ are first and second consecutive symbols, respectively, in the symbol sequence c. The first and second transmit antennae 16-1 and 16-2, respectively, transmit $x_1$ and $x_2$ during two consecutive symbol periods. For example, during a first symbol period, the first transmit antenna 16-1 transmits $c_0$ and the second transmit antenna 16-2 transmits $c_1$. During a second symbol period, the first transmit antenna 16-1 transmits $-c_1^*$ and the second transmit antenna 16-2 transmits $c_0^*$, where $c_0^*$ and $c_1^*$ are the complex conjugates of $c_0$ and $c_1$, respectively. The space-time block encoder 14 transmits complex conjugates of the symbols to add redundancy and to allow a receiver to reconstruct a signal in the event that a transmission path experiences noise and fading. Likewise, symbols $c_2$ and $C_3$ are transmitted during two successive symbol periods.

A receive antenna 18 receives a first signal transmission through $h_{11}$, illustrated at 20-1, and a second signal transmission through $h_{21}$, illustrated at 20-2, where $h_{ij}$ is the channel estimation between transmit antenna i and receive antenna j during a symbol period. During symbol period 2n, where n=0, 1, 2, ..., S−1, the receive antenna 18 receives symbol $r_{2n}$, which is expressed as $r_{2n}=h_{11}c_{2n}+h_{21}c_{2n+1}+n_{2n}$. During symbol period (2n+1), the receive antenna 18 receives symbol $r_{2n+1}$, which is expressed as $r_{2+1}=-h_{11}c_{2n+1}^*+h_{21}c_{2n}^*+n_{2n+1}$. In the equations for $r_{2n}$ and $r_{2n+1}$, $n_{2n}$ and $n_{2n+1}$, respectively, denote additive white Gaussian noise. This assumes that 2S symbols are transmitted during 2S symbol periods. Expressed in matrices, the receive antenna 18 receives symbol sequence r during two consecutive symbol periods, where $$r = \begin{bmatrix} r_{2n} \\ r_{2n+1}^* \end{bmatrix} = \begin{bmatrix} h_{11} & h_{21} \\ h_{21}^* & -h_{11}^* \end{bmatrix} \begin{bmatrix} c_{2n} \\ c_{2n+1} \end{bmatrix} + \begin{bmatrix} n_{2n} \\ n_{2n+1}^* \end{bmatrix} = H \cdot c + n.$$

An input of a space-time block decoder 22 receives received symbol sequence r, and the space-time block decoder 22 outputs a user data sequence $\hat{d}=\{\hat{d}_0, \hat{d}_1, \hat{d}_2, \ldots, \hat{d}_{k-1}\}$ based on r.

Figure 2:
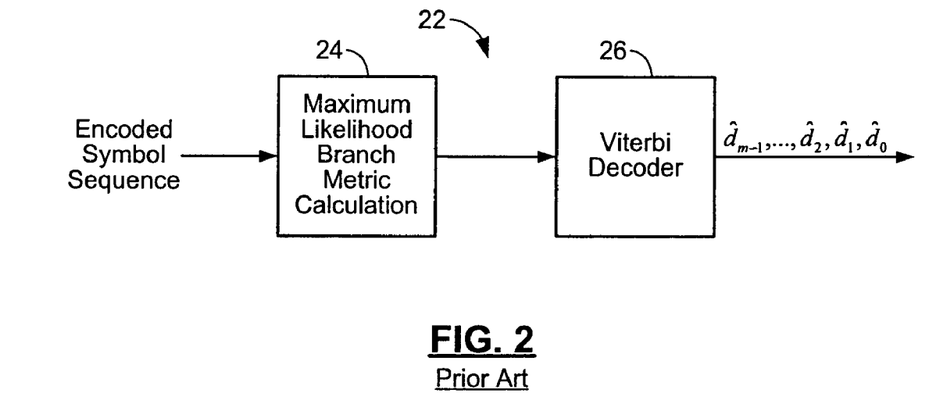
FIG. 2 is a functional block diagram of a space-time block decoder that includes a maximum likelihood branch metric calculation module and a Viterbi decoder according to the prior art.

Referring now to FIG. 2, in one approach, the space-time block decoder 22 includes a maximum likelihood (ML) branch metric calculation module 24 and a Viterbi decoder 26. The ML branch metric calculation module 24 calculates branch metrics that are based on the received symbol sequence r. The Viterbi decoder 26 determines the most likely transmitted symbol sequence based on the accumulated branch metrics. The space-time block decoder 22 utilizes squared Euclidean distances as ML decision metrics to decode the received symbols. When there is one receive antenna, equivalent and independent decision metrics for $c_{2n}$ and $c_{2n+1}$ are derived. For example, decision metric $|r_{2n}-h_{11}c_{2n}-h_{21}c_{2n+1}|^2+|r_{2n+1}+h_{11}c_{2n+1}^*-h_{21}c_{2n}^*|^2$ is derived by squaring the additive white Gaussian noise of $r_{2n}$ and $r_{2n+1}$ and summing the two values. After deleting terms that are independent of the codewords and rearranging the equation, the decision metric for $c_{2n}$ is $|(h_{11}^*r_{2n}+h_{21}r_{2n+1}^*)-c_{2n}|^2+(-1+|h_{11}|^2+|h_{21}|^2)|c_{2n}|^2$. The Viterbi decoder 26 finds the sequence that is closest in distance to the transmitted sequence by comparing a set of possible transitions in the trellis for the underlying code. Since the decision metrics comprise estimates of noise, the Viterbi decoder 26 identifies a sequence with the minimum accumulated metrics.

When an outer encoder is employed, the ML decision metric is used as a branch metric for the Viterbi decoder 26. However, the independent decision metrics for $c_{2n}$ and $c_{2n+1}$ require complex computations. For example, the decision metric for $c_{2n}$ includes complex conjugate multiplication and squaring operations. The complex computations complicate the implementation of the space-time block decoder 22.

SUMMARY OF THE INVENTION

A space-time block decoder for a wireless communications system according to the present invention includes a demodulator that generates a demodulated symbol sequence by derotating a signal constellation of a received symbol sequence. A dimension demultiplexer communicates with the demodulator and generates in-phase and quadrature components of the demodulated symbol sequence. A branch metric computation module communicates with the dimension demultiplexer and generates branch metrics based on the in-phase and quadrature components.

In other features, a Viterbi decoder communicates with the branch metric computation module and generates a user data sequence based on the branch metrics. The demodulator derotates the signal constellation by multiplying the received symbol sequence and a conjugate of a channel response of the wireless communications system. The Viterbi decoder generates the user data sequence by determining a minimum of a plurality of path metrics that comprise accumulations of the branch metrics. The plurality of path metrics includes possible state transitions that identify a successive symbol in the received symbol sequence.

In still other features of the invention, a receiver that communicates with the space-time block decoder includes one receive antenna and a transmitter that communicates with the receiver includes two transmit antennae. The receive antenna receives two symbols during first and second consecutive symbol periods. A receiver that communicates with the space-time block decoder includes at least two receive antennae and a transmitter that communicates with the receiver includes two transmit antennae. A receiver that communicates with the space-time block decoder includes at least two receive antennae and a transmitter that communicates with the receiver includes at least two transmit antennae.

In yet other features, at least one symbol in the received symbol sequence is encoded with an orthogonal space-time code. The signal constellation is generated by one of a bi-phase shift keying (BPSK) code, a quadrature phase shift keying (QPSK) code, a 16-quadrature amplitude modulation (QAM) code, a 64-QAM code, and a 256-QAM code. The space-time block decoder is implemented in a wireless metropolitan area network (WMAN). The space-time block decoder is implemented in a wireless local are network (WLAN).

In still other features of the invention, the in-phase and quadrature components comprise Gray coded data that is bit-interleaved. The branch metric computation module implements bit-by-bit piecewise linear approximation to generate the branch metrics. A deinterleaver that communicates with the branch metric computation module generates deinterleaved metrics based on the branch metrics.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

When a channel response H is orthogonal, a received symbol sequence r may be demodulated by determining the product of r and a conjugate of the channel response H*. The resulting demodulated symbol sequence includes demodulated symbols $z_1$ and $z_2$, which may be expressed as $$\begin{bmatrix} z_1 \\ z_2 \end{bmatrix} = H^* r = \begin{bmatrix} h_{11}^* r_{2n} + h_{21} r_{2n+1}^* \\ h_{21}^* r_{2n} - h_{11} r_{2n+1}^* \end{bmatrix} =$$

$$(|h_{11}|^2 + |h_{21}|^2) \begin{bmatrix} c_{2n} \\ c_{2n+1} \end{bmatrix} + \begin{bmatrix} h_{11}^* n_{2n} + h_{21} n_{2n+1}^* \\ h_{21}^* n_{2n} - h_{11} n_{2n+1}^* \end{bmatrix}.$$

A resultant noise vector is uncorrelated with a noise autocorrelation matrix $R_{\overline{nn}} = (|h_{11}|^2 + |h_{21}|^2)\Gamma^2 I$, where $\sigma^2$ is the noise variance of the original noise and I is the 2×2 identity matrix. Since symbols $c_{2n}$ and $c_{2n+1}$ have independent decision metrics, $c_{2n}$ and $c_{2n+1}$ may be determined independently. Additionally, the space-time block code and the outer code may be jointly decoded using maximum likelihood sequence estimation.

Figure 3:
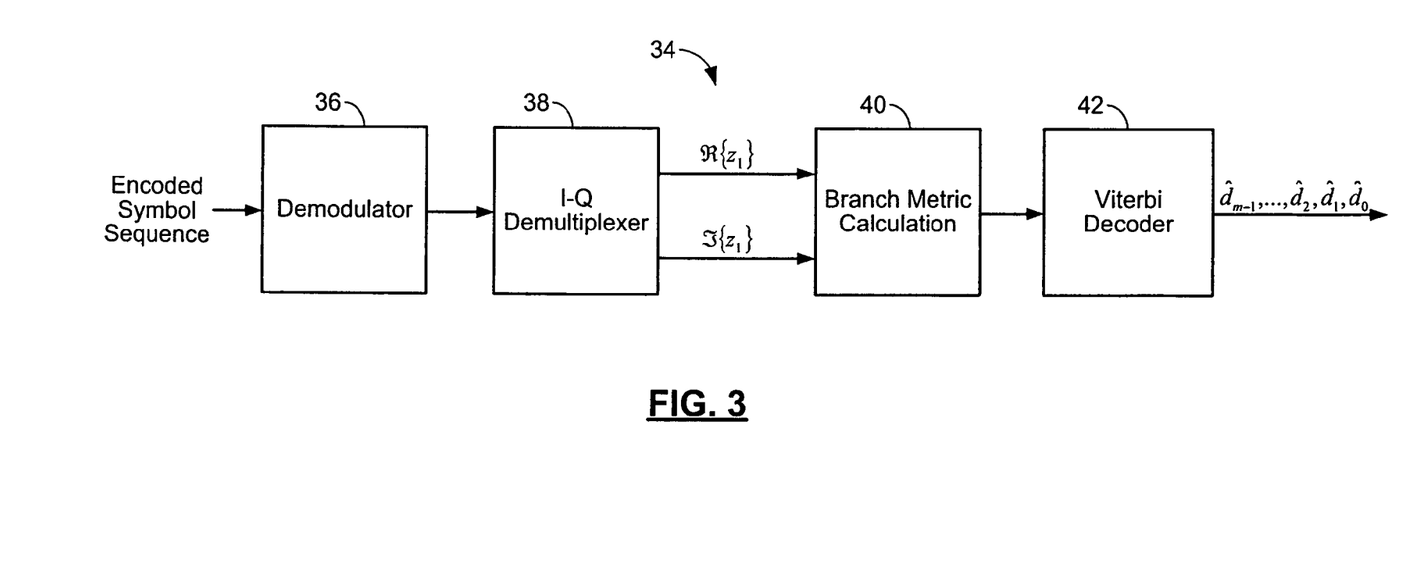
FIG. 3 is a functional block diagram of a space-time block decoder that includes a one-dimensional branch metric computation module according to the present invention.

Referring now to FIG. 3, a space-time block decoder 34 according to the present invention includes a demodulator 36, a I-Q demultiplexer 38, a one-dimensional branch metric computation module 40, and a Viterbi decoder 42. The demodulator 36 multiplies the received symbol sequence r by a conjugate of the channel response H*. This derotates a signal constellation of the received symbol sequence r and results in a scaling factor that is multiplied by symbols $c_{2n}$ and $C_{2n+1}$. The result is a demodulated symbol sequence z that is decoupled.

The demodulator 36 outputs demodulated symbol sequence z to the I-Q demultiplexer 38. The I-Q demultiplexer 38 selects a demodulated symbol $z_i$ in the demodulated symbol sequence z and outputs one of an in-phase and quadrature component of the demodulated symbol $z_i$. For example, $\Re\{z_i\}$ is the in-phase component of demodulated symbol $z_i$, and $\Im\{z_i\}$ is the quadrature component of demodulated symbol $z_i$. The I-Q demultiplexer 38 independently outputs the in-phase and quadrature components of demodulated symbol $z_i$ to the one-dimensional branch metric computation module 40. The one-dimensional branch metric computation module 40 separately computes the branch metrics for $\Re\{z_i\}$ and $\Im\{z_i\}$, and the Viterbi decoder 42 determines a user data sequence d̂ based on path metrics that comprise accumulations of the branch metrics. For example, the one-dimensional branch metric computation module 40 may first process $\Re\{z_i\}$ followed by $\Im\{z_i\}$.

The Viterbi decoder 42 determines a minimum of a plurality of path metrics that are sums of the branch metrics in their corresponding paths to determine user data sequence d̂. The path metrics comprise possible state transitions that identify a successive symbol in user data sequence d̂. The branch metric for each transition of an additive white Gaussian noise channel (AWGN) is the minimum squared Euclidean distance between a received symbol and the symbol that is associated with a possible transition. This method applies to all orthogonal space-time block codes. The Viterbi decoder 42 may be any decoder capable of determining decoded symbols based on computed branch metrics.

Since the received symbol sequence r is multiplied by H* during demodulation, the additive white Gaussian noise n of an encoded symbol $r_i$ is also weighted by H*. Therefore, demodulated symbols from different blocks of the space-time block encoder 14 may have different noise power, and the noise power at different decoding stages of the Viterbi decoder 42 will be inconsistent. This has the potential to reduce the performance of the Viterbi decoder 42. Therefore, the branch metric computation additionally normalizes the noise power to maintain consistency. A branch metric $$BM_i = \left\| \frac{z_i}{|H|} - |H|c_i \right\|^2,$$

for a complex demodulated symbol $z_i$, where $|H|^2 = |h_{11}|^2 + |h_{21}|^2$ and where $|H| = \sqrt{|h_{11}|^2 + |h_{21}|^2}$. By deleting terms that are independent of $c_i$, $BM_i = -2(\Re\{z_i\}\Re\{c_i\} + \Im\{z_i\}\Im\{c_i\}) + |H|^2 \cdot |c_i|^2$, for complex symbols $c_i$ and $z_i$.

For commonly used signal constellations such as quadrature phase shift keying (QPSK) and quadrature amplitude modulation (QAM), the branch metrics for each dimension of the demodulated symbol sequence z may be separately computed. Therefore, the one-dimensional branch metric $BM_{i,I}$ of a demodulated symbol $z_i$ is expressed as $BM_{i,I} = -2z_{i,I}c_{i,I} + (|H|^2 \cdot c_{i,I}^2)$. The one-dimensional branch metric $BM_{i,I}$ denotes one of the in-phase branch metric $\Re\{BM_{i,I}\}$ and the quadrature branch metric $\Im\{BM_{i,I}\}$ of demodulated symbol $z_i$. The possible values of $c_{i,I}$ depend on the current signal constellation and the constellation points that are included in the current constellation. For example, $c_{i,I} = \pm 1$ for QPSK, $c_{i,I} = \pm 1$ or $\pm 3$ for 16-QAM, and $c_{i,I} = \pm 1$, $\pm 3$, $\pm 5$, or $\pm 7$ for 64-QAM. However, other signal constellations may be employed. Since the Viterbi decoder 42 determines the most likely transmitted sequence from all possible coded sequences, branch metrics are typically computed for all possible values of $c_{i,I}$ for a current signal constellation. However, due to limitations in the possible paths of state transitions in the Viterbi decoder 42, branch metrics may only need to be calculated for certain constellation points with a given symbol.

For a QPSK constellation, $c_{i,I} = \pm 1$. Therefore, $|H|^2 \cdot c_{i,I}^2$ is a constant. Only the sign of $c_{i,I}$ is relevant to a comparison of the possible branch metrics for demodulated symbol $z_i$, and $BM_{i,I} = -z_{i,I} \cdot \text{sign}(c_{i,I})$. When the sign of $c_{i,I}$ is positive, $BM_{i,I}$ is equal to $-z_{i,I}$ and when the sign of $c_{i,I}$ is negative, $BM_{i,I}$ is equal to $z_{i,I}$. An 8-PSK constellation comprises two rotated QPSK constellations. Therefore, a simplified branch metric computation similar to QPSK constellations may be utilized. This requires that a demodulated symbol $z_i$ is appropriately pre-rotated, which may be implemented by employing a rotation factor. Since $c_{i,I}$ may be equal to values other than $\pm 1$ for constellations that are more complicated than QPSK such as 16-QAM and 64-QAM, $|H|^2 \cdot c_{i,I}^2$ is computed when determining the branch metric.

Figure 4:
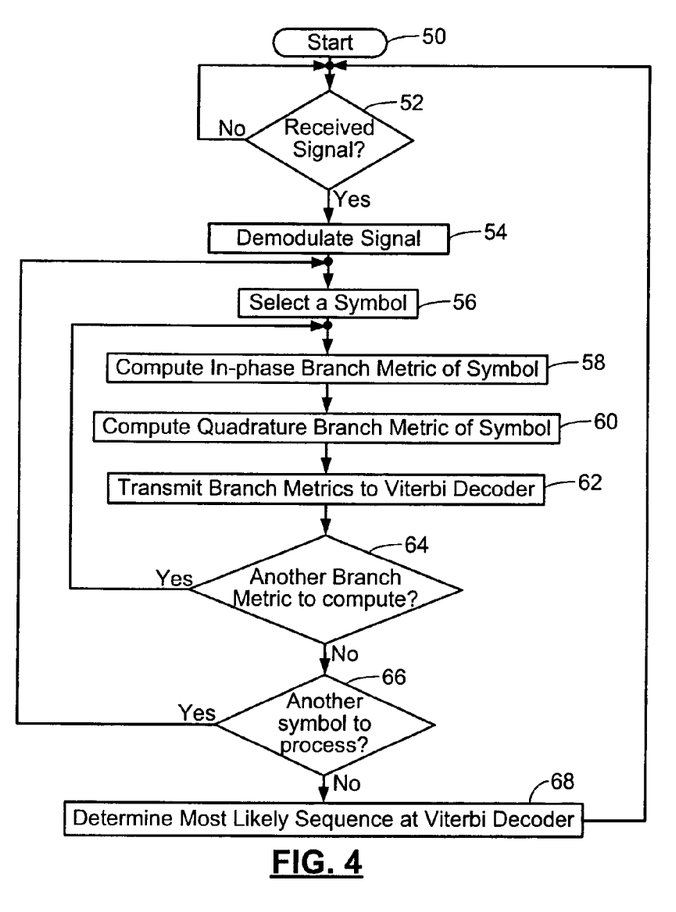
FIG. 4 is a flowchart illustrating steps performed by the space-time block decoder of FIG. 3.

Referring now to FIG. 4, a decoding algorithm that is implemented by the space-time block decoder 34 of FIG. 3 begins in step 50. In step 52, control determines whether a signal was received. If false, control loops to step 52. If true, control proceeds to step 54. In step 54, the demodulator 36 generates a demodulated symbol sequence by demodulating the received symbol sequence. In step 56, the I-Q demultiplexer 38 selects a demodulated symbol from the demodulated symbol sequence. In step 58, the I-Q demultiplexer 38 outputs the in-phase component of the demodulated symbol and the one-dimensional branch metric computation module 40 computes a branch metric based on the in-phase component. In step 60, the I-Q demultiplexer 38 outputs the quadrature component of the demodulated symbol and the one-dimensional branch metric computation module 40 computes a branch metric based on the quadrature component.

In step 62, the one-dimensional branch metric computation module 40 transmits branch metrics from steps 58 and 60 to the Viterbi decoder 42. In step 64, control determines whether there are additional branch metrics to compute for the symbol. If true, control returns to step 58. If false, control proceeds to step 66. In step 66, control determines whether there is another demodulated symbol in the demodulated symbol sequence to process. If true, control returns to step 56. If false, control proceeds to step 68. In step 68, the Viterbi decoder determines the most likely received sequence based on path metrics that comprise accumulated branch metrics and control returns to step 52.

Figure 5:
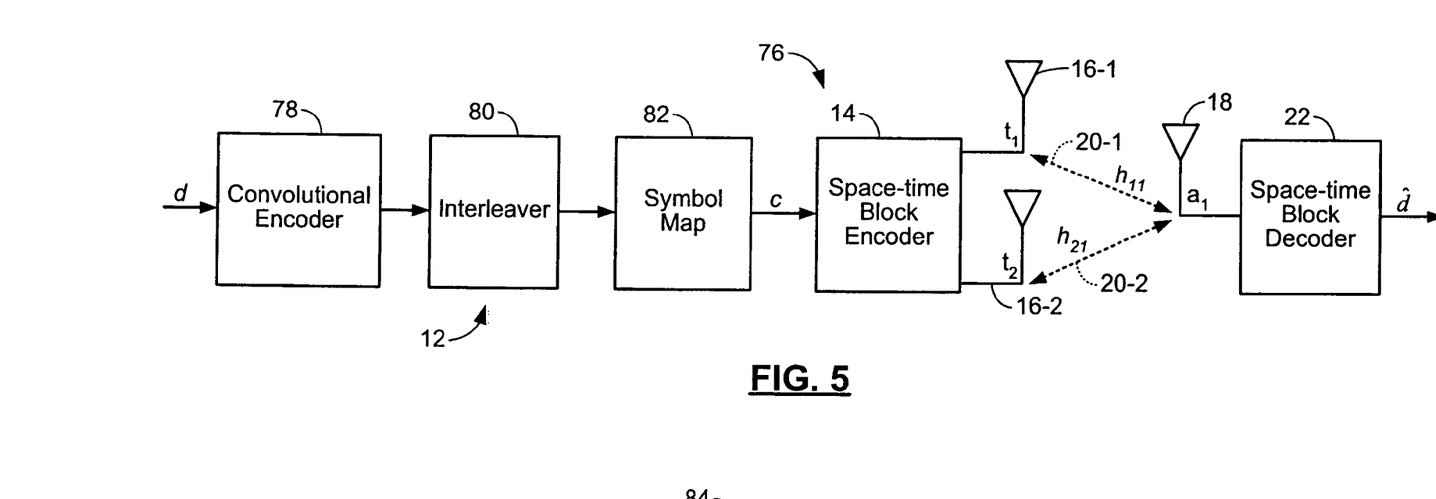
FIG. 5 is a functional block diagram of a wireless communications system that includes a BICM outer encoder.

Referring now to FIG. 5, in a second wireless communications system 76, the outer encoder 12 is a BICM. The outer encoder 12 includes a convolutional encoder 78, an interleaver 80, and a symbol map module 82. For example, systems according to IEEE 802.11a/g and IEEE 802.16a standards implement BICM outer encoders. An input of the convolutional encoder 78 receives the user data sequence d. The convolutional encoder 78 protects transmitted data in the second wireless communications system 76 against noise and imposes a sequencing order. An input of the interleaver 80 receives a symbol sequence from the convolutional encoder 78. The interleaver 80 is utilized to spread burst errors across multiple symbols. An input of the symbol map module 82 receives a symbol sequence from the interleaver 80. The symbol map module 82 maps symbols to constellation points in a signal constellation such as a QPSK, QAM, or another signal constellation. The symbol map module 82 outputs the encoded symbol sequence c to the space-time block encoder 14.

Some BICM codes such as those used in IEEE 802.11a/g and IEEE 802.16a systems use Gray symbol mapping. With Gray symbol mapping, constellation points are mapped to binary representations. For example, in a QPSK constellation, Gray coded bit 0 may map to −1 and Gray coded bit 1 may map to 1 for either dimension of a constellation point. In a 16-QAM constellation, Gray coded bits 00 may map to −3, Gray coded bits 01 may map to −1, Gray coded bits 11 may map to 1, and Gray coded bits 10 may map to 3 for either dimension of a constellation point. The sequences are Gray coded by ensuring that binary representations of constellation points differ from binary representations of adjacent constellation points by only one bit. The number of bits required to represent a constellation point depend on the current signal constellation. For example, a constellation point in a QPSK constellation is identified by 2 total bits. The 2 bits include 1 in-phase bit, and 1 quadrature bit. A constellation point in a 16-QAM constellation is identified by 4 bits. The 4 bits include 2 in-phase bits and 2 quadrature bits. A constellation point in a 64-QAM constellation includes 6 total bits. The 6 bits include 3 in-phase bits and 3 quadrature bits. A constellation point in a 256-QAM constellation includes 8 total bits. The 8 bits include 4 in-phase bits and 4 quadrature bits. When Gray symbol mapping is implemented, bit-by-bit piecewise linear approximation can be used to compute the branch metrics.

Figure 6:
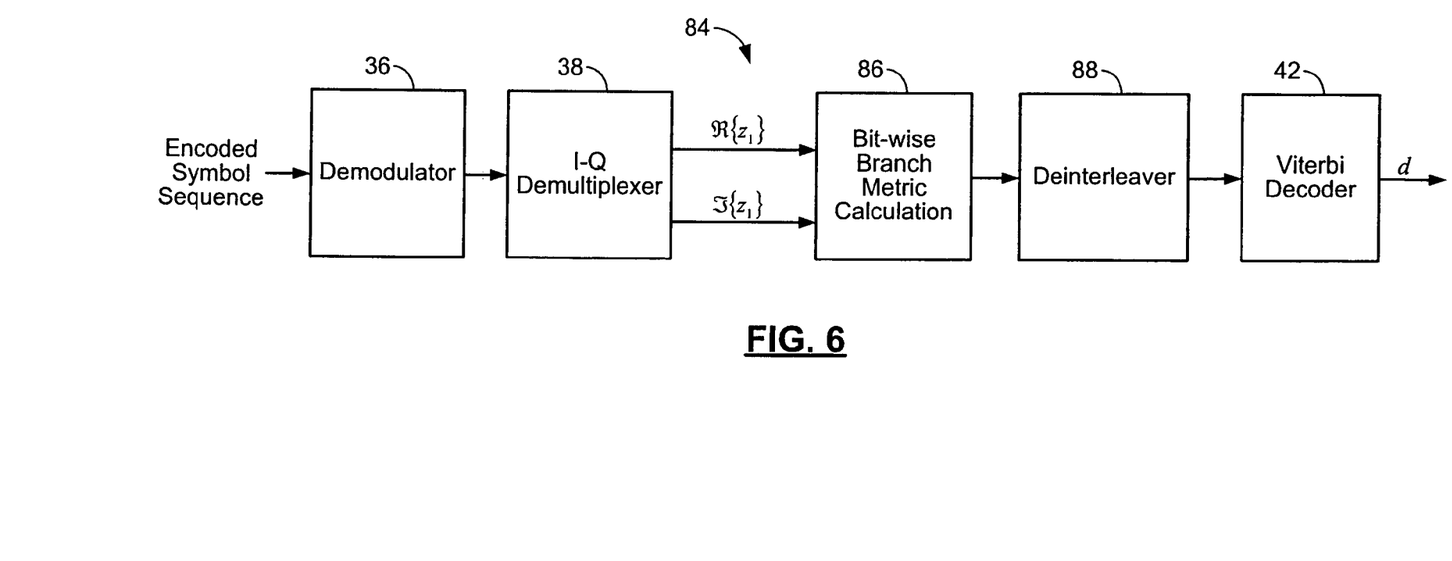
FIG. 6 is a functional block diagram of a space-time block decoder that includes a bit-wise branch metric calculation module and a deinterleaver.

Referring now to FIG. 6, a space-time block decoder 84 includes a bit-wise branch metric computation module 86 that determines bit-wise branch metrics of demodulated symbols. A deinterleaver 88 receives branch metrics from the bit-wise branch metric computation module 86 and performs the opposite operation of the interleaver 80. The Viterbi decoder 42 receives deinterleaved branch metrics from the deinterleaver 88.

For the bit-wise branch metric computations, $b_j$ denotes a bit in the binary representation of either the in-phase or quadrature component $c_{i,I}$ of decoded symbol $c_i$. For example, in a 16-QAM constellation, $c_{i,I}$ is represented with two bits, where $c_{i,I} = \{b_0, b_1\}$. The slope of branch metric $BM_{i,j} = -z_{i,I} \text{sign}(c_{i,I})$ is 1, and the symbol decision region for an in-phase or quadrature component $z_{i,I}$ of demodulated symbol $z_i$ is equal to $|H|^2 \cdot m$. The value of m depends on the current signal constellation as well as the current bit $b_j$ in $c_{i,I}$ for which the branch metric is being computed. For example, in a QPSK constellation, m is equal to 0. This is because both dimensions of a constellation point in QPSK are either −1 or 1 and both dimensions are mapped to binary bits 0 and 1, respectively. Therefore, the decision region is located at zero. For a 16-QAM constellation, m is equal to either 0 or 2. The first bit in a binary representation of a dimension in a 16-QAM constellation point determines whether the constellation point is greater than or equal to zero. Therefore, m is equal to zero when computing the bit-wise branch metrics for the first bit of a Gray symbol mapped in-phase or quadrature component of a demodulated symbol. When computing the bit-wise branch metrics for the second bit, m is equal to 2. This is because $2|H|^2$ is the boundary between positive dimensional components of a 16-QAM constellation point. Similarly, m is equal to either 0, 2, or 4 in a 64-QAM constellation when determining bit-wise branch metrics for the first, second, or third bits, respectively.

Figure 7:
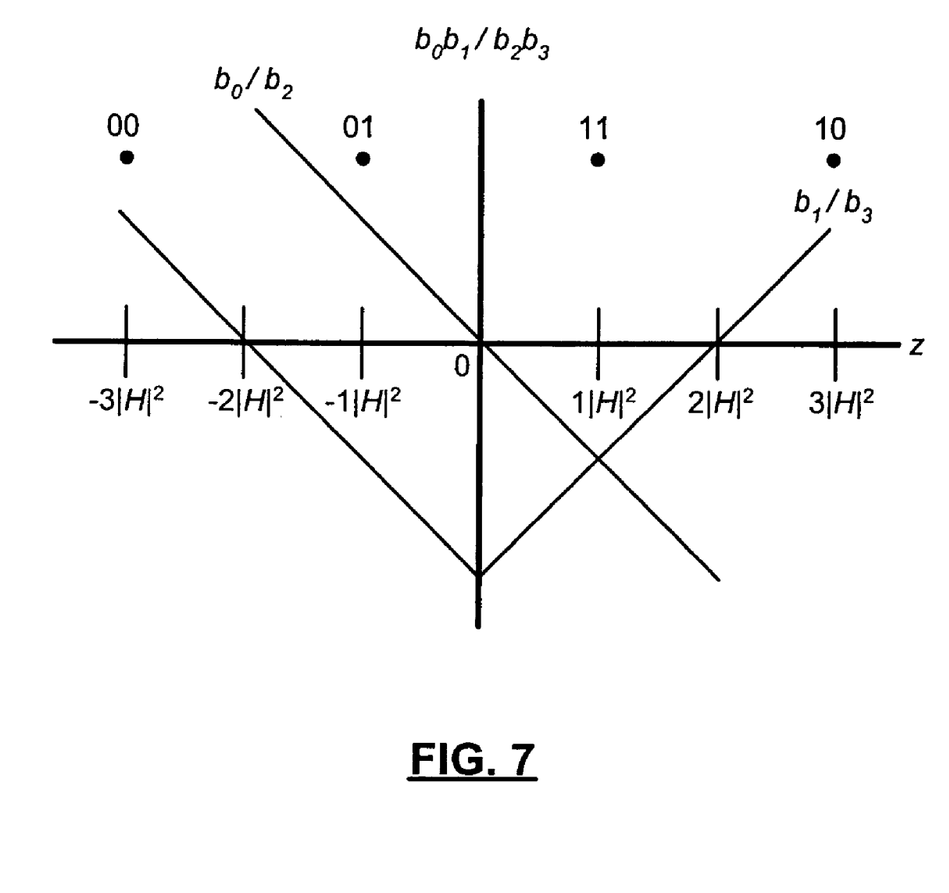
FIG. 7 illustrates bit-by-bit piecewise approximation to compute bit-wise branch metrics.

The bit-wise branch metric $BM_{i,j} = -(|z_{i,j}| - |H|^2 \cdot m) \cdot \text{sign}(b_j)$, where j denotes the number of the current bit in $c_{i,I}$ for which the branch metric is being computed. The term $\text{sign}(b_j)$ denotes the sign of the current bit and is determined by conventional mapping schemes. For example, $\text{sign}(b_j)$ may be equal to −1 when the current bit is 0, and $\text{sign}(b_j)$ may be equal to 1 when the current bit is 1. FIG. 7 illustrates bit-by-bit piecewise linear approximation for computing branch metrics with a 16-QAM constellation. Bits $b_0$ and $b_1$ represent a Gray symbol mapped in-phase component of a demodulated symbol $z_i$, and bits $b_2$ and $b_3$ represent a Gray symbol mapped quadrature component of $z_i$. The Gray symbol mapping illustrated in FIG. 6 is defined by the IEEE 802.11a/g standard, which is hereby incorporated by reference in its entirety.

Figure 8:
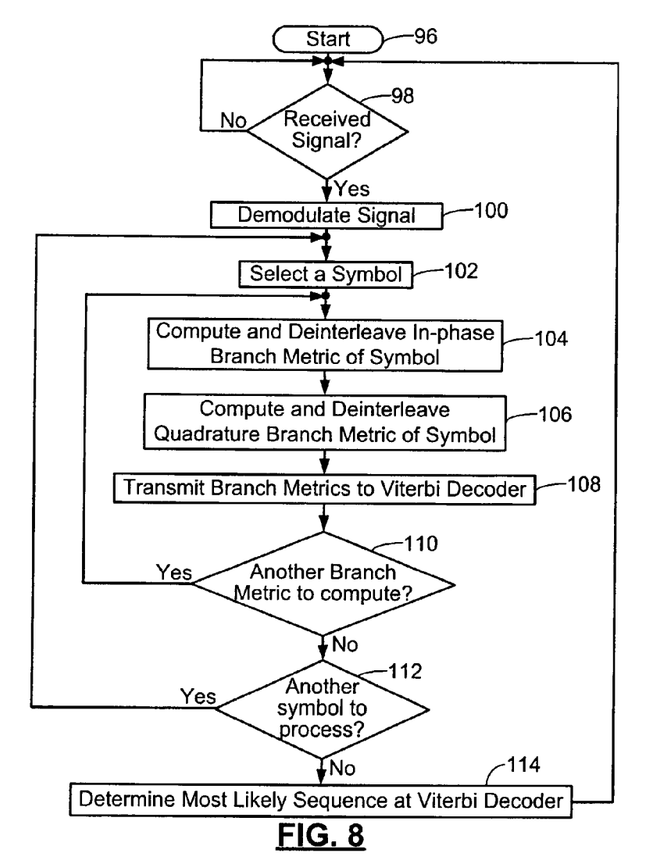
FIG. 8 is a flowchart illustrating steps performed by the space-time block decoder of FIG. 6.

Referring now to FIG. 8, a decoding algorithm that is implemented by the space-time block decoder 84 of FIG. 6 begins in step 96. In step 98, control determines whether a signal was received. If false, control loops to step 98. If true, control proceeds to step 100. In step 100, the demodulator 36 generates a demodulated symbol sequence by demodulating the received symbol sequence. In step 102, the I-Q demultiplexer 38 selects a demodulated symbol from the demodulated symbol sequence. In step 104, the I-Q demultiplexer 38 outputs the in-phase component of the demodulated symbol. The bit-wise branch metric computation module 86 computes a branch metric based on the in-phase component, and the deinterleaver 88 deinterleaves the branch metric. In step 106, the I-Q demultiplexer 38 outputs the quadrature component of the demodulated symbol. The bit-wise branch metric computation module 86 computes a branch metric based on the quadrature component, and the deinterleaver 88 deinterleaves the branch metric.

In step 108, the deinterleaver 88 transmits branch metrics from steps 104 and 108 to the Viterbi decoder 42. In step 110, control determines whether there are additional branch metrics to compute for the symbol. If true, control returns to step 104. If false, control proceeds to step 112. In step 112, control determines whether there is another demodulated symbol in the demodulated symbol sequence to process. If true, control returns to step 102. If false, control proceeds to step 114. In step 114, the Viterbi decoder 42 determines the most likely received sequence based on path metrics that comprise accumulated branch metrics and control returns to step 98.

Figure 9:
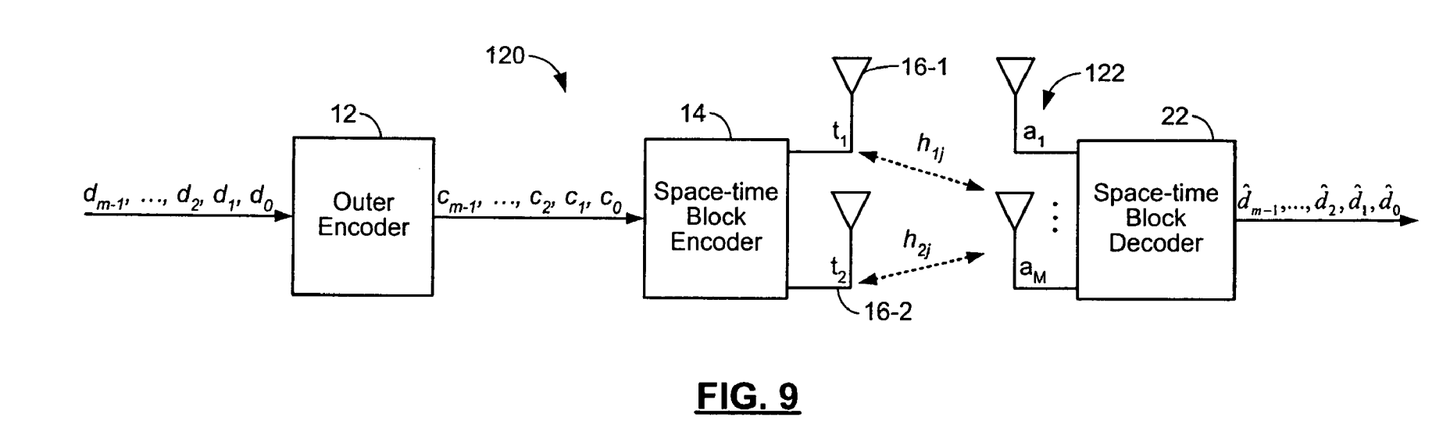
FIG. 9 is a functional block diagram of a wireless communications system that implements space-time block coding with two transmit antennae and at least two receive antennae.

Referring now to FIG. 9, a third wireless communications system 120 includes the first and second transmit antennae 16-1 and 16-2, respectively, and M receive antennae 122, where M is greater than or equal to two. In the case of multiple receive antennae, the demodulated symbol sequence expression is altered. The result is a modified scaling factor multiplied by the decoded symbols. With M receive antennae, $$\begin{bmatrix} \hat{z}_1 \\ \hat{z}_2 \end{bmatrix} = \sum_{j=1}^{M} H_j^* r_j = \left( \sum_{j=1}^{M} \sum_{i=1}^{2} |h_{ij}|^2 \right) \begin{bmatrix} c_{2n} \\ c_{2n+1} \end{bmatrix} + \begin{bmatrix} \sum_{j=1}^{M} \hat{n}_{2n,j} \\ \sum_{j=1}^{M} \hat{n}_{2n+1,j} \end{bmatrix},$$

where $r_j$ expresses the symbols received at receive antenna j during symbol periods 2n and (2n+1) and where $$H_j = \begin{bmatrix} h_{1j} & h_{2j} \\ h_{2j}^* & -h_{1j}^* \end{bmatrix}.$$

Symbols $c_{2n}$ and $c_{2n+1}$ are decoupled, and branch metrics for the in-phase and quadrature components of the demodulated symbol sequence may be independently computed by either the one-dimensional branch metric computation module 40 or the bit-wise branch metric computation module 86. However, with multiple receive antennae, the term $|H|^2$ in the branch metric expressions changes and is equivalent to $$\left( \sum_{j=1}^{M} \sum_{i=1}^{2} |h_{ij}|^2 \right).$$

This is applicable to both the space-time block decoder 34 of FIG. 3 as well as the space-time block decoder 84 of FIG. 6.

Figure 10:
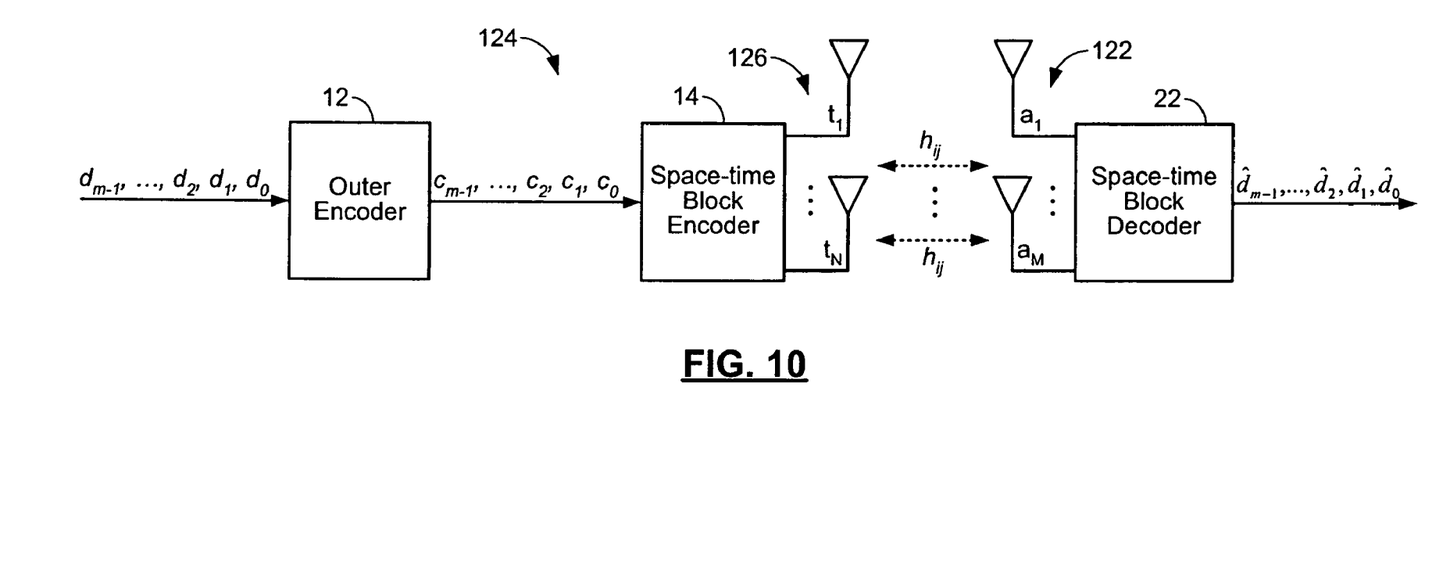
FIG. 10 is a functional block diagram of a wireless communications system that implements space-time block coding with at least two transmit antennae and at least two receive antennae.

Referring now to FIG. 10, a fourth wireless communications system 124 includes at least two transmit antennae 126 and the at least two receive antennae 122. Since all known space-time block codes are based on orthogonal code, the present invention is applicable to orthogonal codes other than $$G_2 = \begin{bmatrix} x_1 & x_2 \\ -x_2^* & x_1^* \end{bmatrix}.$$

Several orthogonal codes allow for more than two transmit antennae and multiple receive antennae. For example, rate-½ and rate-¾ block codes may be employed.

In the case of multiple transmit and multiple receive antennae, the demodulated symbol sequence expression is altered. A modified scaling factor is multiplied by the decoded symbols. With N transmit antennae and M receive antennae, $$\hat{z}_i = \left( \sum_{j=1}^{M} \sum_{i=1}^{N} |h_{ij}|^2 \right) c_i + \hat{n}_i,$$

where demodulated symbol $\hat{z}_i$ corresponds to transmitted symbol $c_i$ (i=0, 1, 2, . . . , k−1). Symbols $c_{2n}$ and $c_{2n+1}$ are decoupled, and branch metrics for the in-phase and quadrature components of the demodulated symbol sequence may be independently computed by either the one-dimensional branch metric computation module 40 or the bit-wise branch metric computation module 86. However, the term $|H|^2$ in the branch metric expressions changes and is equivalent to $$\left( \sum_{j=1}^{M} \sum_{i=1}^{N} |h_{ij}|^2 \right).$$

This is applicable to both the space-time block decoder 34 of FIG. 3 as well as the space-time block decoder 84 of FIG. 6. Since symbol $c_i$ may not be transmitted over every time slot for space-time block codes with rate R<1, $\hat{z}_i$ is a sum of the demodulated symbols corresponding only to the time slots where $c_i$ is transmitted.

The present invention allows for joint space-time block decoding and Viterbi decoding of an outer trellis-based code. The space-time block decoding metrics are built into the maximum likelihood sequence estimation metrics. By demodulating the received symbol sequence, the branch metric and bit-wise branch metric computations are simplified. The present invention is applicable to all orthogonal space-time block codes.

The present invention is applicable to systems that implement a trellis-based outer encoder such as a TCM or BICM encoder that is in serial concatenation with a space-time block encoder. The present invention also provides additional benefits for orthogonal frequency division multiplexed (OFDM) systems such as systems implemented according to IEEE 802.11a/g and IEEE 802.16a. This is because frequency domain equalization (FEQ) is no longer necessary. In the case of a single transmit and receive antenna, the equalization for each sub-carrier may be built into the Viterbi decoder 42 decision metrics. In the event that $H=|H|e^{j\Theta}$, variations of the demodulation process may be implemented. Such variations include using the phase $e^{-j\Theta}$ instead of $H^*$. In this case, those skilled in the art can appreciate that the scaling factor is altered accordingly.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A space-time block decoder for a wireless communications system, comprising:
   a demodulator that generates a demodulated symbol sequence by derotating a signal constellation of a received symbol sequence;
   a dimension demultiplexer that communicates with said demodulator and that generates in-phase and quadrature components of said demodulated symbol sequence that are encoded based on a space time block code and an outer code; and
   a branch metric computation module that communicates with said dimension demultiplexer and that generates branch metrics based on said in-phase and quadrature components.

2. The space-time block decoder of claim 1 further comprising:
   a Viterbi decoder that communicates with said branch metric computation module and that generates a user data sequence based on said branch metrics.

3. The space-time block decoder of claim 2 wherein said Viterbi decoder generates said user data sequence by determining a minimum of a plurality of path metrics that comprise accumulations of said branch metrics.

4. The space-time block decoder of claim 3 wherein said plurality of path metrics includes possible state transitions that identify a successive symbol in said received symbol sequence.

5. The space-time block decoder of claim 1 wherein said demodulator derotates said signal constellation by multiplying said received symbol sequence and a conjugate of a channel response of said wireless communications system.

6. The space-time block decoder of claim 1 wherein a receiver that communicates with said space-time block decoder includes one receive antenna and a transmitter that communicates with said receiver includes two transmit antennae.

7. The space-time block decoder of claim 6 wherein said receive antenna receives two symbols during first and second consecutive symbol periods.

8. The space-time block decoder of claim 1 wherein a receiver that communicates with said space-time block decoder includes at least two receive antennae and a transmitter that communicates with said receiver includes two transmit antennae.

9. The space-time block decoder of claim 1 wherein at least one symbol in said received symbol sequence is encoded with an orthogonal space-time code.

10. The space-time block decoder of claim 1 wherein said signal constellation is generated by one of a bi-phase shift keying (BPSK) code, a quadrature phase shift keying (QPSK) code, a 16-quadrature amplitude modulation (QAM) code, a 64-QAM code, and a 256-QAM code.

11. The space-time block decoder of claim 1 wherein said space-time block decoder is implemented in a wireless metropolitan area network (WMAN).

12. The space-time block decoder of claim 1 wherein said space-time block decoder is implemented in a wireless local area network (WLAN).

13. The space-time block decoder of claim 1 wherein said in-phase and quadrature components comprise Gray coded data that is bit-interleaved.

14. The space-time block decoder of claim 13 wherein said branch metric computation module implements bit-by-bit piecewise linear approximation to generate said branch metrics.

15. The space-time block decoder of claim 14 further comprising:
a deinterleaver that communicates with said branch metric computation module and that generates deinterleaved metrics based on said branch metrics.

16. The space-time block decoder of claim 1 wherein said received symbol sequence is encoded based on a space-time block code in concatenation with an outer code.

17. The space-time block decoder of claim 16 wherein said outer code generates a symbol sequence that is based off of user data that is mapped to constellation points of a signal constellation.

18. The space-time block decoder of claim 16 wherein said space-time block code generates blocks of symbols based on a symbol sequence for transmission over multiple antennas.

19. The space-time block decoder of claim 1 wherein said received symbol sequence is encoded based on a space-time block code that is transmitted over a plurality of antennas.

20. The space-time block decoder of claim 1 wherein said branch metric computation module generates said branch metrics based on a one-dimensional relationship between said branch metrics and said demodulated symbol sequence and said in-phase and quadrature components.

21. The space-time block decoder of claim 1 wherein said branch metric computation module generates said branch metrics for each dimension of said demodulated symbol sequence separately.

22. The space-time block decoder of claim 1 wherein said branch metric computation module determines branch metrics based on expression $BM_{i,I} = -2z_{i,I}c_{i,I} + (|H|^2 \cdot c_{i,I}^2)$, where $z_{i,I}$ is a demodulated symbol, $c_{i,I}$ is a complex symbol, H is a channel response, and i and I are integers.

23. The space-time block decoder of claim 1 wherein said branch metric computation module determines branch metrics based on expression $BM_{i,I} = -z_{i,I} \text{sign}(c_{i,I})$, where $z_{i,I}$ is a demodulated symbol, and $c_{i,I}$ is a complex symbol, and i and I are integers.

24. The space-time block decoder of claim 1 wherein said branch metric computation module determines branch metrics based on at least one expression selected from $BM_{i,I} = -z_{i,I}$ and $BM_{i,I} = -z_{i,I}$, where $z_{i,I}$ is a demodulated symbol and i and I are integers.

25. The space-time block decoder of claim 1 wherein said branch metric computation module generates said branch metrics based on said in-phase and quadrature components for joint decoding of each of said in-phase and quadrature components.

26. A receiver for a wireless communications system, comprising:
at least one receiving antenna that receives a received symbol sequence; and
a space-time block decoder that communicates with said at least one receiving antenna, that generates a user data sequence based on said received symbol sequence, and that includes:
a branch metric computation module that generates branch metrics based on separated in-phase and quadrature components of a demodulated symbol sequence,
wherein said demodulated symbol sequence is based on said received symbol sequence, and
wherein said separated in-phase and quadrature components are encoded based on a space time block code and an outer code.

27. The receiver of claim 26 wherein said space-time block decoder includes a demodulator that communicates with said at least one receiving antenna and that generates said demodulated symbol sequence by derotating a signal constellation of said received symbol sequence.

28. The receiver of claim 27 wherein said space-time block decoder includes a dimension demultiplexer that communicates with said demodulator and said branch metric computation module and that generates said in-phase and quadrature components.

29. The receiver of claim 27 wherein said demodulator derotates said signal constellation by multiplying said received symbol sequence and a conjugate of a channel response of said wireless communications system.

30. The receiver of claim 27 wherein said signal constellation is generated by one of a bi-phase shift keying (BPSK) code, a quadrature phase shift keying (QPSK) code, a 16-quadrature amplitude modulation (QAM) code, a 64-QAM code, and a 256-QAM code.

31. The receiver of claim 26 wherein said space-time block decoder includes a Viterbi decoder that communicates with said branch metric computation module and that generates said user data sequence based on said branch metrics.

32. The receiver of claim 31 wherein said Viterbi decoder generates said user data sequence by determining a minimum of a plurality of path metrics that comprise accumulations of said branch metrics.

33. The receiver of claim 32 wherein said plurality of path metrics comprises possible state transitions that identify a successive symbol in said received symbol sequence.

34. The receiver of claim 26 wherein said receiver includes one receive antenna and wherein a transmitter that communicates with said receiver includes two transmit antennae.

35. The receiver of claim 34 wherein said receive antenna receives two symbols during first and second consecutive symbol periods.

36. The receiver of claim 26 wherein a transmitter that communicates with said receiver includes two transmit antennae.

37. The receiver of claim 26 wherein a transmitter that communicates with said receiver includes at least two transmit antennae.

38. The receiver of claim 26 wherein at least one symbol in said received symbol sequence is encoded with an orthogonal space-time code.

39. The receiver of claim 26 wherein said receiver is implemented in a wireless metropolitan area network (WMAN).

40. The receiver of claim 26 wherein said receiver is implemented in a wireless local area network (WLAN).

41. The receiver of claim 26 wherein said in-phase and quadrature components comprise Gray coded data that is bit-interleaved.

42. The receiver of claim 41 wherein said branch metric computation module implements bit-by-bit piecewise linear approximation to generate said branch metrics.

43. The receiver of claim 42 further comprising a deinterleaver that communicates with said branch metric computation module and that generates deinterleaved metrics based on said branch metrics.

44. The space-time block decoder of claim 26 wherein said space-time block decoder decodes a space-time block code that is concatenated with an outer code.

45. A space-time block decoder for a wireless communications system, comprising:
    demodulating means for generating a demodulated symbol sequence by derotating a signal constellation of a symbol sequence;
    dimension demultiplexing means that communicates with said demodulating means for generating in-phase and quadrature components of said demodulated symbol sequence that are encoded based on a space time block code and an outer code; and
    branch metric computing means that communicates with said dimension demultiplexing means for generating branch metrics based on said in-phase and quadrature components.

46. The space-time block decoder of claim 45 further comprising:
    Viterbi decoding means that communicates with said branch metric computing means for generating user data based on said branch metrics.

47. The space-time block decoder of claim 46 wherein said Viterbi decoding means generates said user data by determining a minimum of a plurality of path metrics that comprise accumulations of said branch metrics.

48. The space-time block decoder of claim 47 wherein said plurality of path metrics includes possible state transitions that identify a successive symbol in said symbol sequence.

49. The space-time block decoder of claim 45 wherein said demodulating means derotates said signal constellation by multiplying said symbol sequence and a conjugate of a channel response of said wireless communications system.

50. The space-time block decoder of claim 45 wherein at least one symbol in said symbol sequence is encoded with an orthogonal space-time code.

51. The space-time block decoder of claim 45 wherein said signal constellation is generated by one of a bi-phase shift keying (BPSK) code, a quadrature phase shift keying (QPSK) code, a 16-quadrature amplitude modulation (QAM) code, a 64-QAM code, and a 256-QAM code.

52. The space-time block decoder of claim 45 wherein said space-time block decoder is implemented in a wireless metropolitan area network (WMAN).

53. The space-time block decoder of claim 45 wherein said space-time block decoder is implemented in a wireless local area network (WLAN).

54. The space-time block decoder of claim 45 wherein said in-phase and quadrature components comprise Gray coded data that is bit-interleaved.

55. The space-time block decoder of claim 54 wherein said branch metric computing means implements bit-by-bit piecewise linear approximation to generate said branch metrics.

56. The space-time block decoder of claim 55 further comprising:
    deinterleaving means that communicates with said branch metric computing means for generating deinterleaved metrics based on said branch metrics.

57. A receiver for a wireless communications system, comprising:
    receiving means for receiving a symbol sequence; and
    space-time block decoding means that communicates with said receiving means for generating user data based on said symbol sequence, and that includes:
    branch metric computing means for generating branch metrics based on separated in-phase and quadrature components of a demodulated symbol sequence,
    wherein said demodulated symbol sequence is based on said symbol sequence, and
    wherein said separated in-phase and quadrature components are encoded based on a space time block code and an outer code.

58. The receiver of claim 57 wherein said space-time block decoding means includes demodulating means that communicates with said receiving means for generating said demodulated symbol sequence by derotating a signal constellation of said symbol sequence.

59. The receiver of claim 58 wherein said space-time block decoding means includes dimension demultiplexing means that communicates with said demodulating means and said branch metric computing means for generating said in-phase and quadrature components.

60. The receiver of claim 58 wherein said demodulating means derotates said signal constellation by multiplying said symbol sequence and a conjugate of a channel response of said wireless communications system.

61. The receiver of claim 58 wherein said signal constellation is generated by one of a bi-phase shift keying (BPSK) code, a quadrature phase shift keying (QPSK) code, a 16-quadrature amplitude modulation (QAM) code, a 64-QAM code, and a 256-QAM code.

62. The receiver of claim 57 wherein said space-time block decoding means includes Viterbi decoding means that communicates with said branch metric computing means for generating said user data based on said branch metrics.

63. The receiver of claim 62 wherein said Viterbi decoding means generates said user data by determining a minimum of a plurality of path metrics that comprise accumulations of said branch metrics.

64. The receiver of claim 63 wherein said plurality of path metrics comprises possible state transitions that identify a successive symbol in said symbol sequence.

65. The receiver of claim 57 wherein at least one symbol in said symbol sequence is encoded with an orthogonal space-time code.

66. The receiver of claim 57 wherein said receiver is implemented in a wireless metropolitan area network (WMAN).

67. The receiver of claim 57 wherein said receiver is implemented in a wireless local area network (WLAN).

68. The receiver of claim 57 wherein said in-phase and quadrature components comprise Gray coded data that is bit-interleaved.

69. The receiver of claim 68 wherein said branch metric computing means implements bit-by-bit piecewise linear approximation to generate said branch metrics.

70. The receiver of claim 69 further comprising deinterleaving means that communicates with said branch metric computing means for generating deinterleaved metrics based on said branch metrics.

71. A method for operating a space-time block decoder in a wireless communications system, comprising:
generating a demodulated symbol sequence by derotating a signal constellation of a received symbol sequence;
separating in-phase and quadrature components of said demodulated symbol sequence that are encoded based on a space time block code and an outer code; and
generating branch metrics based on said in-phase and quadrature components.

72. The method of claim 71 further comprising generating user data based on said branch metrics.

73. The method of claim 72 further comprising generating said user data by determining a minimum of a plurality of path metrics that comprise accumulations of said branch metrics.

74. The method of claim 73 wherein said plurality of path metrics includes possible state transitions that identify a successive symbol in said received symbol sequence.

75. The method of claim 71 further comprising derotating said signal constellation by multiplying said received symbol sequence and a conjugate of a channel response of said wireless communications system.

76. The method of claim 71 wherein at least one symbol in said received symbol sequence is encoded with an orthogonal space-time code.

77. The method of claim 71 wherein said signal constellation is generated by one of a bi-phase shift keying (BPSK) code, a quadrature phase shift keying (QPSK) code, a 16-quadrature amplitude modulation (QAM) code, a 64-QAM code, and a 256-QAM code.

78. The method of claim 71 wherein said space-time block decoder is implemented in a wireless metropolitan area network (WMAN).

79. The method of claim 71 wherein said space-time block decoder is implemented in a wireless local area network (WLAN).

80. The method of claim 71 wherein said in-phase and quadrature components comprise Gray coded data that is bit-interleaved.

81. The method of claim 80 further comprising implementing bit-by-bit piecewise linear approximation to generate said branch metrics.

82. The method of claim 81 further comprising generating deinterleaved metrics based on said branch metrics.

83. A method of operating a receiver for a wireless communications system, comprising:
receiving a symbol sequence; and
generating user data based on said symbol sequence by generating branch metrics based on separated in-phase and quadrature components of a demodulated symbol sequence,
wherein said demodulated symbol sequence is based on said received symbol sequence, and
wherein said separated in-phase and quadrature components are encoded based on a space time block code and an outer code.

84. The method of claim 83 further comprising generating said demodulated symbol sequence by derotating a signal constellation of said received symbol sequence.

85. The method of claim 84 further comprising derotating said signal constellation by multiplying said received symbol sequence and a conjugate of a channel response of said wireless communications system.

86. The method of claim 84 wherein said signal constellation is generated by one of a bi-phase shift keying (BPSK) code, a quadrature phase shift keying (QPSK) code, a 16-quadrature amplitude modulation (QAM) code, a 64-QAM code, and a 256-QAM code.

87. The method of claim 83 further comprising generating said user data based on said branch metrics.

88. The method of claim 87 further comprising generating said user data by determining a minimum of a plurality of path metrics that comprise accumulations of said branch metrics.

89. The method of claim 88 wherein said plurality of path metrics comprises possible state transitions that identify a successive symbol in said received symbol sequence.

90. The method of claim 83 wherein at least one symbol in said symbol sequence is encoded with an orthogonal space-time code.

91. The method of claim 83 wherein said receiver is implemented in a wireless metropolitan area network (WMAN).

92. The method of claim 83 wherein said receiver is implemented in a wireless local area network (WLAN).

93. The method of claim 83 wherein said in-phase and quadrature components comprise Gray coded data that is bit-interleaved.

94. The method of claim 93 further comprising implementing bit-by-bit piecewise linear approximation to generate said branch metrics.

95. The method of claim 94 further comprising generating deinterleaved metrics based on said branch metrics.

* * * * *